United States Patent
Lefebvre et al.

(10) Patent No.: US 9,724,957 B2
(45) Date of Patent: Aug. 8, 2017

(54) IRREVERSIBLY MAGNETICALLY INDUCED IMAGES OR PATTERNS

(71) Applicant: SICPA HOLDING SA, Prilly (CH)

(72) Inventors: Olivier Lefebvre, Montagny-pres-Yverdon (CH); Patrick Magnin, Maxilly-sur-Leman (FR); Christophe Schaller, Ollon (CH)

(73) Assignee: SICPA HOLDING SA, Prilly (CH)

( * ) Notice: Subject to any disclaimer, the term of this patent is extended or adjusted under 35 U.S.C. 154(b) by 48 days.

(21) Appl. No.: 14/441,666

(22) PCT Filed: Oct. 22, 2013

(86) PCT No.: PCT/EP2013/072077
§ 371 (c)(1),
(2) Date: May 8, 2015

(87) PCT Pub. No.: WO2014/072172
PCT Pub. Date: May 15, 2014

(65) Prior Publication Data
US 2015/0298485 A1    Oct. 22, 2015

(30) Foreign Application Priority Data

Nov. 9, 2012   (EP) .................................... 12191947

(51) Int. Cl.

| | |
|---|---|
| B42D 25/378 | (2014.01) |
| B41M 3/14 | (2006.01) |
| C09D 11/50 | (2014.01) |
| B42D 25/29 | (2014.01) |
| B42D 25/00 | (2014.01) |
| B05D 3/00 | (2006.01) |
| B05D 5/06 | (2006.01) |
| H01F 41/16 | (2006.01) |
| C09D 11/037 | (2014.01) |
| C09D 11/101 | (2014.01) |
| B42D 25/369 | (2014.01) |
| B05D 3/06 | (2006.01) |
| C09D 11/02 | (2014.01) |
| C09D 11/102 | (2014.01) |
| C09D 11/107 | (2014.01) |
| C09D 11/108 | (2014.01) |

(52) U.S. Cl.
CPC ........... *B42D 25/378* (2014.10); *B05D 3/067* (2013.01); *B05D 3/207* (2013.01); *B05D 5/061* (2013.01); *B41M 3/14* (2013.01); *B42D 25/00* (2014.10); *B42D 25/29* (2014.10); *B42D 25/369* (2014.10); *C09D 11/02* (2013.01); *C09D 11/037* (2013.01); *C09D 11/101* (2013.01); *C09D 11/102* (2013.01); *C09D 11/107* (2013.01); *C09D 11/108* (2013.01); *C09D 11/50* (2013.01); *H01F 41/16* (2013.01); *B42D 2033/16* (2013.01); *B42D 2033/20* (2013.01)

(58) Field of Classification Search
CPC .................................................... B42D 25/378
USPC ........................................................ 523/160
See application file for complete search history.

(56) References Cited

U.S. PATENT DOCUMENTS

| | | |
|---|---|---|
| 4,434,010 A | 2/1984 | Ash |
| 4,838,648 A | 6/1989 | Phillips |
| 5,084,351 A | 1/1992 | Philips |
| 5,171,363 A | 12/1992 | Phillips |
| 5,211,877 A | 5/1993 | Andrejewski et al. |
| 6,192,890 B1 * | 2/2001 | Levy ...................... C09D 11/00 |
| | | 128/899 |
| 6,423,246 B1 | 7/2002 | Kasch |
| 6,565,770 B1 | 5/2003 | Mayer |
| 7,108,742 B2 | 9/2006 | Hall-Goulle |
| 7,449,212 B2 | 11/2008 | Schneider |
| 2006/0008924 A1 | 1/2006 | Anker |
| 2009/0099342 A1 * | 4/2009 | Braconnot ................ C08F 2/24 |
| | | 530/391.1 |

(Continued)

FOREIGN PATENT DOCUMENTS

| | | |
|---|---|---|
| EP | 0227423 | 7/1987 |
| EP | 0601483 | 6/1994 |

(Continued)

OTHER PUBLICATIONS

Leach et al., "The Printing Ink Manual," 5th Edition, 2008.

(Continued)

*Primary Examiner* — Doris Lee
(74) *Attorney, Agent, or Firm* — Greenblum & Bernstein, P.L.C.

(57) ABSTRACT

The present invention relates to the field of the protection of security documents, especially banknotes, against illegal actions such as robbery or theft. In particular, the present invention relates to the field of ink compositions for producing irreversibly magnetically induced images or patterns, said inks comprising multichromal microspheres, preferably bichromal microspheres (1) that are orientable upon application of a magnetic field and that comprise at least a first portion (2) comprising one or more dyes and/or pigments and at least a second portion (3) comprising one or more magnetic or magnetizable materials, wherein said microspheres (1) comprise as the first portion a core (2) having a surface and comprising the one or more dyes and/or pigments and as the second portion a partial coating (3) covering at least a portion of the surface of said core (2) and comprising the one or more magnetic or magnetizable materials.

14 Claims, 2 Drawing Sheets

(56) References Cited

U.S. PATENT DOCUMENTS

| | | |
|---|---|---|
| 2009/0162625 A1 | 6/2009 | Takeuchi et al. |
| 2009/0184169 A1* | 7/2009 | Degott .................. B05D 3/207 235/493 |
| 2012/0167666 A1 | 7/2012 | Nair |

FOREIGN PATENT DOCUMENTS

| | | |
|---|---|---|
| EP | 0686675 | 12/1995 |
| EP | 1046692 | 10/2000 |
| EP | 1213338 | 6/2002 |
| EP | 1970753 | 9/2008 |
| JP | 06-297890 | 10/1994 |
| WO | 02/073250 | 9/2002 |
| WO | 03/000801 | 1/2003 |
| WO | 2005/00585 | 1/2005 |
| WO | 2005/002866 | 1/2005 |
| WO | 2007/060133 | 5/2007 |
| WO | 2007/131833 | 11/2007 |
| WO | 2008/000755 | 1/2008 |
| WO | 2008/033059 | 3/2008 |
| WO | 2008/046702 | 4/2008 |
| WO | 2008/092522 | 8/2008 |
| WO | 2009/005733 | 1/2009 |
| WO | 2010/058026 | 5/2010 |

OTHER PUBLICATIONS

Crivello et al., "Photoinitiators for Free Radical Cationic & Anionic Photopolymerisation," Chemistry & Technology of UV & EB Formulation for Coatings, Inks & Paints, 1998.

Adams et al., "Printing Technology," 5th Edition, 2002.

R.L. van Renesse, "Optical Document Security," 3rd Edition, 2005.

McNaughton et al., "Fabrication of uniform half-shell magnetic nanoparticles and microspheres with applications as magnetically modulated optical nanoprobes," Appl. Phys. Lett., Jun. 15, 2005, pp. 1-6.

Fergason, "Cholesteric Structure 1 Optical Properties," Molecular Crystals vol. 1, 1966, pp. 293-307.

Anker et al., "Magnetically modulated optical nanoprobes," Appl. Phys. Lett. (82), Feb. 17, 2003, pp. 1102-1104.

* cited by examiner

IRREVERSIBLY MAGNETICALLY INDUCED IMAGES OR PATTERNS

FIELD OF THE INVENTION

The present invention relates to the field of ink compositions for producing irreversibly magnetically induced images, and more particularly it relates to ink compositions for producing irreversibly magnetically induced images for use on security documents to protect them against counterfeit or illegal reproduction.

BACKGROUND OF THE INVENTION

With the constantly improving quality of color photocopies and printings and in an attempt to providing security documents such as banknotes, value documents or cards, transportation tickets or cards, tax banderols, and product labels that have no reproducible effects and thus protecting them against counterfeiting, falsifying or illegal reproduction, it has been the conventional practice to incorporate various security means in these documents. Typical example of security means include security threads, windows, fibers, planchettes, foils, decals, holograms, watermarks, security inks comprising optically variable pigments, magnetic or magnetizable thin-film interference pigments, interference-coated particles, thermochromic pigments, photochromic pigments, luminescent, infrared-absorbing, ultraviolet-absorbing or magnetic compounds.

Coatings, printings and markings exhibiting a viewing-angle-dependant visual appearance and colorshift properties are used as efficient anti-copy means on banknotes and security documents (cf. "Optical Document Security", ed. R. L. van Renesse; 2nd edition, 1998, Artech House, London). Optically variable inks are formulated on the base of optically variable pigments (OVPs), preferably flakes of the thin-film optical interference device disclosed for example in U.S. Pat. No. 4,434,010; U.S. Pat. No. 5,084,351; U.S. Pat. No. 5,171,363; EP-0 227 423 A2 and in related documents.

Non-optically variable magnetic pigments or flakes have been used as security features. For example, JP-A 06-297890 discloses non-optically variable magnetic pigments that are specifically oriented in a way to provide an anti-photocopy security features.

As an upgrade from optically variable ink, optically variable magnetic pigments have been specifically designed and used in security applications. Optically variable magnetic pigments which can be used for security purpose have been disclosed in U.S. Pat. No. 4,838,648; in EP-0 686 675 A1, WO 2002/073250 A2 and WO 2003/000801 A2. Corresponding inks and coating compositions have been disclosed in WO 2007/131833 A1.

WO 2005/002866 A1 discloses optically variable printed security elements, comprising a high-resolution image represented by oriented optically variable magnetic flakes in a solid or hardened coating layer. The high-resolution image is produced by using a particular magnetic orienting device. The security document is first imprinted with an ink or coating composition comprising magnetic or magnetizable particles, such as optically variable magnetic pigment flakes. The imprinted document is subsequently exposed, while the coating is still "wet", to the magnetic field of the magnetic orienting device, comprising a magnetized permanent-magnetic plate engraved with indicia. The magnetic or magnetizable particles of the coating are oriented under the influence of the magnetic field of the orienting device, hereby forming an image of said engraved indicia. The coating is subsequently hardened, so as to freeze the magnetic or magnetizable particles in their positions and orientations.

Whereas several printing processes are available for applying an ink or coating composition comprising optically variable magnetic flakes, WO 2005/00585 A1 discloses that the most convenient method consists of a silkscreen printing process. Indeed, silkscreen printing ensure that the flakes are not destroyed or damaged during the printing process and has the advantage that the inks or varnishes used in such a process exhibit a relatively low viscosity which favors proper and fast orientation of the magnetic flakes.

U.S. Pat. No. 7,449,212 B2 discloses a security element comprising a material that is optically changeable by an electric or magnetic field. The optically changeable material is enclosed in microcapsules containing a swelling agent and incorporated in a binder. The so-obtained security element may be incorporated into a security document and may be switched within the dried or cured binder from one optical state to another optical state. Consequently, it is possible to change the form of appearance of a printed character solely by moving the security document within an electric or magnetic field.

Therefore, a need remains for ink compositions comprising magnetic of magnetizable particles that are easily and fast oriented in ink compositions.

SUMMARY

The inventors have surprisingly found that the incorporation of multichromal microspheres, preferably bichromal microspheres that are orientable upon application of a magnetic field and that comprise at least a first portion (2) comprising one or more dyes and/or pigments and at least a second portion (3) comprising one or more magnetic or magnetizable materials and that comprise a) a core comprising one or more dyes and/or pigments and b) a partial coating comprising one or more magnetic or magnetizable materials, in a conventional ink composition allows the formation of irreversibly magnetically induced images or patterns by any conventional printing or coating process.

Described herein are ink compositions for producing irreversibly magnetically induced images or patterns comprising multichromal microspheres, preferably bichromal microspheres that are orientable upon application of a magnetic field and that comprise at least a first portion (2) comprising one or more dyes and/or pigments and at least a second portion (3) comprising one or more magnetic or magnetizable materials. More specifically, the present invention is related to ink compositions for producing irreversibly magnetically induced images or patterns comprising multichromal microspheres, preferably bichromal microspheres that are orientable upon application of a magnetic field and that comprise at least a first portion (2) comprising one or more dyes and/or pigments and at least a second portion (3) comprising one or more magnetic or magnetizable materials, wherein said microspheres, preferably bichromal microspheres, comprise as the first portion a core (2) having a surface and comprising the one or more dyes and/or pigments described herein and as the second portion a partial coating (3) covering at least a portion of the surface of said core (2) and comprising the one or more magnetic or magnetizable materials described herein, and processes for making said ink compositions.

Also described herein are uses of the multichromal microspheres, preferably bichromal microspheres described herein for producing an irreversibly magnetically induced image or pattern on a substrate.

Also described herein are irreversibly magnetically induced images or patterns on a substrate, wherein the image or pattern comprises the multichromal microspheres, preferably bichromal microspheres described herein in a cured ink composition; processes for producing said irreversibly magnetically induced images or patterns; uses of said irreversibly magnetically induced images or patterns as security elements or devices; and security documents comprising said security elements or devices.

BRIEF DESCRIPTION OF THE DRAWINGS

The invention can be explained with the help of the following non-limiting figures:

FIG. 1A depicts bichromal microspheres (1) having a partial coating covering a portion of a surface of the core of about 50% and FIG. 1B depicts bichromal microspheres (1) having a partial coating covering a portion of a surface the core of less than about 50%.

DETAILED DESCRIPTION

The following definitions are to be used to interpret the meaning of the terms discussed in the description and recited in the claims.

As used herein, the article "a" indicates one as well as more than one and does not necessarily limit its referent noun to the singular.

As used herein, the terms "about" and "substantially" mean that the amount or value in question may be the value designated or some other value about the same. The phrases are intended to convey that similar values within a range of ±5% of the indicated value promote equivalent results or effects according to the invention.

As used herein, the term "and/or" or "or/and" means that either all or only one of the elements of said group may be present. For example, "A and/or B" shall mean "only A, or only B, or both A and B".

As used herein, the term "at least" is meant to define one or more than one, for example one or two or three.

As used herein, the term "comprise" or variations such as "comprises" or "comprising" will be understood to imply the inclusion of a stated feature, integer, step or component or group of features, integers, steps or components but does not preclude the presence or addition of one or more others features, integers, steps or components.

The term "composition" refers to any composition which is capable of forming a solid coating on a substrate and which can be applied preferentially but not exclusively by a printing method.

As used herein, the term "pigment" is to be understood according to the definition given in DIN 55943: 1993-11 and DIN EN 971-1: 1996-09. Pigments are materials in powder or flake form which are—contrary to dyes—not soluble in the surrounding medium.

As used herein, the term "dyes" refers to substances imparting color and used, contrary to pigments, as a solution in an adequate solvent.

The present invention is based on the use of microspheres which may exhibit more than one color and which may be oriented in a magnetic field. According to the present invention, it is preferred that the multichromal microspheres are bichromal, i.e. they exhibit two colors. The multichromal microspheres, preferably bichromal microspheres, described herein comprise as the first portion a core having a surface and comprising one or more dyes and/or pigments and as the second portion a partial coating covering at least a portion of the surface of said core comprising one or more magnetic or magnetizable materials. Upon a specific orientation of said microspheres such that one portion of the microspheres can be perceived with a first color and another portion of the microspheres can be perceived with a different color, desired patterns, indicia etc. may be formed. Suitable and preferred bichromal microspheres for the present invention combine an optical anisotropy and a magnetic anisotropy due to the partial coating of a core comprising one or more dyes and/or pigments, i.e. a colored core and the partial coating comprising one or more magnetic or magnetizable materials. The partial coating of the core imparts to the microspheres an anisotropic magnetic orientability in the ink composition.

Figure 2:
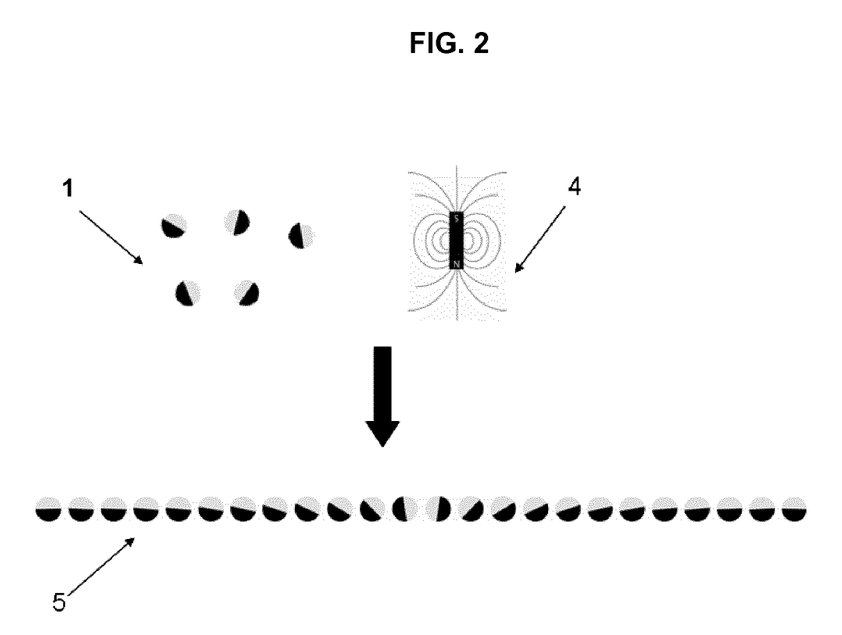
FIG. 2 illustrates an embodiment of the process of the prevention invention, wherein bichromal microspheres (1) may be magnetically oriented upon application of a magnetic field (4) so as to form a magnetically induced image or pattern (5).

Since the color of the core of the preferably bichromal microspheres, described herein is different from the color of the partial coating of the preferably bichromal microspheres, the multichromal microspheres, preferably bichromal microspheres, exhibit optical anisotropy. The anisotropies of the microspheres, i.e. the magnetic and optic properties, allow the creation of specific design, including for example color shadings and 3D effects. When present in a not-cured composition, i.e. a composition in a fluid state, the multichromal microspheres, preferably bichromal microspheres, described herein are essentially freely orientable, i.e. rotatable and movable, and can be magnetically rotated and oriented upon application of a magnetic field, said orientation and position being permanently fixed or frozen by curing or hardening said composition. Consequently, the optical properties of the printed ink composition comprising the multichromal microspheres, preferably bichromal microspheres, can be magnetically modulated and fine-tuned. As shown in FIG. 2, the bichromal microspheres described herein move and rotate in response to the applied magnetic field, so that the microspheres may exhibit the color of the core, may exhibit the color of the coating or may exhibit a combination of both resulting in specific designs, resulting in high contrast images, resulting in shading of colors or resulting in 3D effects.

The core of the preferably bichromal microspheres described herein is preferably substantially spherical. The term "substantially spherical" refers to particles that are substantially round or oval in shape.

The core of the preferably bichromal microspheres described herein preferably has a longest diameter between about 1 μm (microns) and about 100 μm (microns), more preferably between about 10 μm (microns) and about 75 μm (microns) and still more preferably between about 30 μm (microns) and about 60 μm (microns). The determination of the longest diameter of these cores is measured via TEM (Transmission electron microscopy).

The core of the multichromal microspheres, preferably the core of the bichromal microspheres, described herein comprises one or more dyes and/or pigments in a matrix. The one or more dyes and/or pigments are preferably present in the matrix in an amount from about 0.1 to about 75 weight percent, more preferably in an amount from about 0.5 to about 50 weight percent, the weight percentages being based on the total weight of the core.

Preferably, the matrix is made of a material selected from the group consisting of polymer materials, glasses, ceramics and mixtures thereof. More preferably, the matrix is made of a material selected from the group consisting of polymer materials. Typical examples of polymer materials include without limitation poly(methyl methacrylates), polyethylenes, polyurethanes and mixtures thereof.

The core of the multichromal microspheres, preferably the core of the bichromal microspheres, described herein may further comprise one or more machine readable feature substances selected from the group consisting of cholesteric liquid crystal materials, luminescent compounds, UV-absorbing compounds, infrared-absorbing compounds and mixtures thereof. Preferably, the core of the multichromal microspheres, preferably the core of the bichromal microspheres, described herein may further comprise one or more machine readable feature substances selected from the group consisting of luminescent compounds, UV-absorbing compounds, infrared-absorbing compounds and mixtures thereof. The term "machine readable feature substance" refers to a security substance that bears information which becomes visible when using a machine, device, detector or other external aid such as a circularly polarizing filter (in the case of cholesteric liquid crystal pigments as machine readable security substance) and a UV-lamp (in the case of a luminescent compound). Machine readable feature substance can be admixed to or comprised in the core of the multichromal microspheres, preferably the core of the bichromal microspheres, described herein in a suitable shape, size and/or state so as to confer a way to authenticate any article comprising said material by the use of a specific equipment for its authentication. Machine readable feature substances comprised in a security document as machine detectable security elements require a detector or other external aid to provide the required condition for verification of the security document comprising said security element. The one or more machine readable feature substances are preferably present in amounts and in forms known in the art, provided that their amount is high enough to be authenticated by a specific equipment and provided that their amount does not substantially impair or interfere with the color of the core of the multichromal microspheres, preferably the core of the bichromal microspheres. For example the one or more machine readable feature substances are present in an amount between 5 and 75 wt-%, the weight percent being based on the total weight of the core.

The partial coating of the multichromal microspheres, preferably the partial coating of the bichromal microspheres, comprises one or more magnetic or magnetizable materials.

Figure 1:
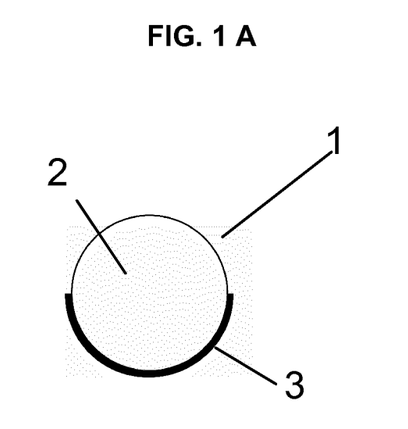
FIGS. 1A and 1B schematically depict cross sections of a bichromal microsphere suitable for the present invention, said bichromal microspheres (1) comprise a core (2) comprising one or more dyes and/or pigments and a partial coating (3) comprising one or more magnetic or magnetizable materials.

As depicted in FIGS. 1A and 1B, the bichromal microspheres (1) suitable for the present invention comprise a core (2) comprising one or more dyes and/or pigments and a partial coating (3) comprising one or more magnetic or magnetizable materials. FIG. 1A depicts bichromal microspheres (1) having a partial coating (3) covering a portion of the surface of the core of about 50% and FIG. 1B depicts bichromal microspheres (1) having a partial coating (3) covering a portion of the surface of the core of less than about 50%. Preferably, the partial coating covers a portion of the surface of the core of about 20% to about 60%, the percent being a surface-percent and being based on the total surface of each of the preferably bichromal microspheres. More preferably, the partial coating covers a portion of the surface of the core of about 40% to about 55%. The partial coating described herein may be continuously present on a portion of the surface of the core or may be discontinuously present such as for example in the form of one or more patterns on the core, the thus formed one or more patterns constituting the second portion of the microspheres. Preferably, the partial coating described herein is continuously present on the core.

Preferably, the partial coating of the core has a thickness below about 20%, preferably of from 1 to 19%, more preferably of from 5 to 15% of the longest diameter of the core.

The partial coating of the multichromal microspheres, preferably the partial coating of the bichromal microspheres, described herein comprises one or more magnetic or magnetizable materials. The partial coating of the multichromal microspheres, preferably the partial coating of the bichromal microspheres, described herein may be made of the one or more magnetic or magnetizable materials described herein dispersed or mixed in a matrix such as those described above for the core of the microspheres or may be made of the one or more magnetic or magnetizable materials described herein dispersed or mixed in one or binders such as those described hereafter. Preferably, the one or more magnetic or magnetizable materials are selected from the group consisting of ferromagnetic compounds, ferrimagnetic compounds and combinations or mixtures thereof, i.e. those magnetic materials which have Weiss domains, independent of their coercivity value. The one or more magnetic or magnetizable materials may be hard magnetic or soft magnetic. "Hard-magnetic" or "permanent-magnetic" shall refer to a material having a coercivity higher than 1000 A/m; whereas "soft-magnetic" or "magnetizable" shall refer to a material having a coercivity lower than or equal to 1000 A/m, as defined in International Standard IEC 60404-1, second edition. Typical examples of suitable magnetic or magnetizable materials include without limitation cobalt; iron; nickel; magnetic alloys of manganese, cobalt, iron or nickel; magnetic pure or mixed oxides of chromium, manganese, cobalt, iron or nickel. Examples of magnetic oxides include without limitation pure and mixed iron oxides such as hematite ($Fe_2O_3$), magnetite ($Fe_3O_4$), magnetic ferrites ($MFe_2O_4$), magnetic hexaferrites ($MFe_{12}O_{19}$), cobalt oxide ($CO_3O_4$) and chromium dioxide ($CrO_2$), M being a divalent metal ion. The one or more magnetic or magnetizable materials are present in amounts known in the art, provided that their amount is high enough to be orientable by a magnetic-field-generating device. The partial coating of the multichromal microspheres, preferably the partial coating of the bichromal microspheres, described herein comprises the one or more magnetic or magnetizable materials preferably in an amount from about 30 to about 75 wt-%, the weight percents being based on the total weight of the partial coating.

The preferably bichromal microspheres described herein may be advantageously prepared by a manufacturing process comprising the step of depositing one or more magnetic or magnetizable materials smoothly onto microspheres supported by a substrate and then suspending and modifying the resulting partially coated, for example half coated, microspheres in solution so as to produce multichromal, preferably bichromal microspheres comprising a core and a partial coating comprising the one or more magnetic or magnetizable materials. The disclosed process is described by J. N. Anker and R. Kopelman, "Magnetically modulated optical nanoprobes", Appl. Phys. Lett. (82), 1102, 2003 or in US-2006/0008924 A1. The magnetic or magnetizable materials may be applied to the microspheres by using ultra high vacuum (UHV) vapor deposition. The disclosed process is described by B. H. McNaughton et al., in "Fabrication of uniform half-shell magnetic nanoparticles and microspheres with applications as magnetically modulated optical nanoprobes" (submitted to Appl. Phys. Lett., Jun. 15, 2005).

The multichromal microspheres, preferably bichromal microspheres, described herein are comprised and embedded in the ink compositions according to the present invention. The multichromal microspheres, preferably bichromal microspheres, described herein can be used as any conventional pigment comprised in a conventional ink that is applied to a substrate by conventional printing or coating process. The multichromal microspheres, preferably bichromal microspheres, described herein can be incorporated in conventional ink or coating compositions according to the printing or coating method selected to print or coat said ink composition and according to the selected curing method.

The multichromal microspheres, preferably bichromal microspheres, described herein are preferably present in the ink composition according to the present invention in an amount from about 1 to about 50 weight percent, more preferably in an amount from about 5 to about 40 weight percent and still more preferably in an amount from about 10 weight percent to about 20 weight percent, the weight percentages being based on the total weight of the ink composition.

The ink composition according to the present invention for producing an irreversibly magnetically induced image or pattern may be an intaglio printing composition or ink, a screen printing composition or ink, a flexographic printing composition or ink, a gravure printing composition or ink, or an inkjet ink or composition, and can be correspondingly used in a intaglio-, a screen-printing, a flexographic-, a gravure- or inkjet-printing. The viscosity of the ink compositions described herein depends on the printing process chosen to apply this ink composition onto a substrate. Typically, viscous or pasty ink compositions are required if the application process consists in intaglio printing (also referred in the art as copperplate intaglio printing or engraved steel die printing) whereas liquid ink compositions are required for application processes including screen printing, flexographic printing and gravure printing. Examples of suitable formulations may be found e.g. in The Printing Ink Manual, Ed R. H. Leach, R. J. Pierce, $5^{th}$ Edition. Preferably, the ink composition according to the present invention is selected from the group consisting of intaglio compositions or inks, screen printing compositions or inks, flexographic printing compositions or inks and gravure printing compositions or inks.

The ink composition according to the present invention may be applied as a marking on a substrate, said marking having a pre-defined design. The pre-defined design is not limited, however; it can be round, polygonal, square; it can be indicia including without limitation symbols, motifs, letters, words, numbers, logos and drawings.

Depending on the printing or coating process used to apply the ink composition according to the present invention onto a substrate and depending on the curing method, different binders may be used. The ink compositions according to the present invention preferably are radiation curable compositions, thermal drying compositions or any combination thereof. Examples of suitable formulations may be found e.g. in The Printing Ink Manual, Ed R. H. Leach, R. J. Pierce, $5^{th}$ Edition. Thermal drying compositions may be selected from the group consisting of compositions of any type of aqueous compositions or solvent-based compositions which are dried by hot air, infrared or by a combination of hot air and infrared. Radiation curable compositions may be selected from the group consisting of compositions that may be cured by UV-visible light radiation (hereafter referred as UV-Vis-curable) or by electron-beam radiation (hereafter referred as EB). Radiation curable compositions are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited.

The ink compositions described above may further comprise one or more cholesteric liquid crystal materials. Liquid crystals in the cholesteric phase exhibit a molecular order in the form of a helical superstructure perpendicular to the longitudinal axes of its molecules. The helical superstructure is at the origin of a periodic refractive index modulation throughout the liquid crystal material, which in turn results in a selective transmission/reflection of determined wavelengths of light (interference filter effect). The observed color is due to a physical reflection effect at the cholesteric helical structure adopted at a given temperature by the liquid crystal material (cf. J. L. Fergason, Molecular Crystals, Vol. 1, pp. 293-307 (1966)). Cholesteric liquid crystal polymers can be obtained by subjecting one or more crosslinkable substances (nematic compounds) with a chiral phase to alignment and orientation. The pitch can be tuned in particular by varying selectable factors including the temperature and solvent concentration, by changing the nature of the chiral component(s) and the ratio of nematic and chiral compounds. This variation in turn, i.e. the pitch of the molecular helices, results in a change of the wavelengths reflected by the cholesteric liquid crystal material. Three-dimensional crosslinking (also described as curing or polymerization reaction) freezes the pitch in a predetermined state by fixing the desired helical form so that the color of the resulting cholesteric liquid crystal polymer is no longer depending on external factors such as the temperature. The particular situation of the helical molecular arrangement leads to cholesteric liquid crystal materials exhibiting the property of reflecting a circularly polarized light component within a determined wavelength range. Since the human eye is unable to detect the polarization state of the light it is receiving, such as the circular polarization effect of cholesteric liquid crystal pigments, a device, such as for example a light-polarizing filter is required. Typically, the viewing equipment comprises a pair of circularly polarized filters, a left circular polarized filter and a right circular polarized filter. Cholesteric liquid crystal materials may then be shaped to cholesteric liquid crystal pigments by subsequently comminuting the polymer to the desired particle size. Examples of films and pigments made from cholesteric liquid crystal polymers and their preparation are disclosed in U.S. Pat. No. 5,211,877; US-5,362; U.S. Pat. No. 6,423,246 and in EP-1 213 338 A1; EP-1 046 692 A1 and EP-0 601 483 A1, the respective disclosure of which is incorporated by reference herein. Pigments made from multilayers of cholesteric liquid crystal polymers may also be suitable for the present invention, examples of such cholesteric liquid crystal pigments are disclosed in WO 2008/000755 A1, which is incorporated by reference. When present, the one or more cholesteric liquid crystal materials are preferably present in an amount from about 5 to about 30 weight percent, the weight percents being based on the total weight of the ink composition.

The ink compositions described above may further comprise one or more machine readable feature substances independently selected from the group consisting of luminescent compounds, UV-absorbing materials, infrared-absorbing compounds and mixtures thereof. The one or more machine readable feature substances are preferably present in amounts and in forms known in the art, provided that their amount is high enough to be authenticated by a specific equipment. For example the one or more machine readable feature substances are present in an amount between 0.1 and 30 wt.-%, the weight percents being based on the total weight of the ink composition.

Luminescent compounds are widely used as marking materials in security applications. Luminescent compounds may be inorganic (inorganic host crystals or glasses doped with luminescent ions), organic or organometallic (complexes of luminescent ion(s) with organic ligand(s)) substances. Luminescent compounds can absorb certain types of energy acting upon them and subsequently emit at least partially this absorbed energy as electromagnetic radiation. Luminescent compounds are detected by exposing with a certain wavelength of light and analyzing the emitted light. Down-converting luminescent compounds absorb electromagnetic radiation at a higher frequency (shorter wavelength) and at least partially re-emit it at a lower frequency (longer wavelength). Up-converting luminescent compounds absorb electromagnetic radiation at a lower frequency and at least partially re-emit part of it at a higher frequency. Light emission of luminescent materials arises from excited states in atoms or molecules. The radiative decay of such excited states has a characteristic decay time, which depends on the material and can range from $10^{-9}$ seconds up to various hours. Short-lived luminescent emission is usually called fluorescence, whereas long-lived emission is called phosphorescence. Both fluorescent and phosphorescent compounds are suitable for the realization of machine-readable feature. In the case of phosphorescent compounds, measurement of decay characteristics may also be carried out and used as a machine-readable feature. Luminescent compounds in pigment form have been widely used in inks (see U.S. Pat. No. 6,565,770, WO 2008/033059 A2 and WO 2008/092522 A1). Examples of luminescent compounds include among others sulphides, oxysulphides, phosphates, vanadates, etc. of non-luminescent cations, doped with at least one luminescent cation chosen from the group consisting of transition-metal and the rare-earth ions; rare earth oxysulfides and rare-earth metal complexes such as those described in WO 2009/005733 A2 or in U.S. Pat. No. 7,108,742. Examples of inorganic compounds materials include $La_2O_2S:Eu$, $ZnSiO_4:Mn$, and $YVO_4:Nd$.

Infrared (IR) absorbing compounds, i.e. compounds absorbing in the near-infrared (NIR) range of the electromagnetic spectrum, most generally in the 700 nm to 2500 nm wavelength range, are widely known and used as marking materials in security applications to confer to the printed documents an additional, covert, security element which help their authentication. For example, IR features have been implemented in banknotes for use by automatic currency processing equipment, in banking and vending applications (automatic teller machines, automatic vending machines, etc.), in order to recognize a determined currency bill and to verify its authenticity, in particular to discriminate it from replicas made by color copiers. IR absorbing compounds include IR absorbing inorganic compounds, glasses comprising substantial amounts of IR-absorbing atoms or ions or entities which display IR-absorption as a cooperative effect, IR absorbing organic compounds and IR absorbing organometallic compounds (complexes of cation(s) with organic ligand(s), wherein either the separate cation and/or the separate ligand, or both in conjunction, have IR-absorbing properties). Typical examples of IR absorbing compounds include among others carbon black, quinone-diimmonium or aminium salts, polymethines (e.g. cyanines, squaraines, croconaines), phthalocyanine or naphthalocyanine type (IR-absorbing pi-system, dithiolenes, quaterrylene diimides, copper phosphates, ytterbium phosphates, lanthanum hexaboride, indium tin oxide, antimony tin oxide in nano-particulate form and doped tin(IV) oxide (cooperative property of the $SnO_4$ crystal). IR absorbing compounds comprising a transition element compound whose infrared absorption is a consequence of electronic transitions within the d-shell of transition element atoms or ions such as those described in WO 2007/060133 A1 may also be used for the present invention.

The ink compositions according to the present invention may further comprise one or more additives including without limitation coloring materials as well as compounds and materials which are used for adjusting physical and chemical parameters of the ink such as the pH value, the viscosity (e.g. solvents and surfactants), the consistency (e.g. fillers and plasticizers), the foaming properties (e.g. antifoaming agents), the lubricating properties (waxes), UV stability (photosensitizers and photostabilizers), etc. Additives described herein may be present in the ink compositions disclosed herein in amounts and in forms known in the art, including in the form of so-called nano-materials where at least one of the dimensions of the particles is in the range of 1 to 1000 nm.

The ink compositions according to the present invention may be prepared by dispersing or mixing the binder, the multichromal microspheres, preferably bichromal microspheres, described herein and each optional additive or ingredient when present, thus forming liquid or pasty inks. When the ink composition described herein is a radiation-curable ink composition, the one or more photoinitiators may be added to the ink composition either during the dispersing or mixing step of all other ingredients or may be added at a later stage, i.e. after the formation of the liquid or pasty inks.

The ink compositions according to the present invention are particularly suitable for producing irreversibly magnetically induced images or patterns by magnetic orientation of the microspheres contained in the ink composition. Described herein are uses of the ink compositions according to the present invention for producing an irreversibly magnetically induced image or pattern on a substrate. According to the present invention, an irreversibly magnetically induced image or pattern is an image or pattern which maintains its magnetic orientation after its formation and cannot be undone by application of a further magnetic field.

Described herein are also irreversibly magnetically induced images or patterns on a substrate, wherein the images or patterns comprise the multichromal microspheres, preferably bichromal microspheres, described herein in a cured ink composition.

Described herein are processes for preparing or producing irreversibly magnetically induced images or patterns and producing irreversibly magnetically induced images or patterns obtained thereof. The process according to the present invention for preparing or for producing an irreversibly magnetically induced image or pattern comprises i) a step of applying the ink composition described herein on a substrate so as to form a coating or layer; ii) a step of magnetically orienting the multichromal microspheres, preferably bichromal microspheres described herein by applying a magnetic field in the applied ink composition obtained under step i) so as to form an oriented ink composition; and iii)

curing the oriented ink composition obtained under step ii) so as to obtain a cured ink composition and to irreversibly fix the multichromal microspheres, preferably bichromal microspheres, described herein in the oriented positions.

The substrate described herein, on which the ink composition of the present invention as described above is applied, may consist in an intrinsic part of a security document, i.e. the irreversibly magnetically induced image or pattern is directly applied, preferably by a printing process, on the security document. Alternatively, the irreversibly magnetically induced image or pattern may be produced onto an auxiliary substrate such as for example a security thread, security stripe, a foil, a decal or a label and consequently transferred to a security document in a separate step. Those substrates and methods for applying ink compositions onto them are known in the art and do not have to be described in detail here.

The ink composition described herein may be applied to the substrate described herein by a process selected from the group consisting of intaglio printing, screen printing, flexographic printing, gravure printing, inkjet printing and combinations thereof, preferably a process selected from the group consisting of intaglio printing, screen printing, flexographic printing, gravure printing and combinations thereof. These processes are well-known to the skilled man and are described for example in Printing Technology, J. M. Adams and P. A. Dolin, Delmar Thomson Learning, $5^{th}$ Edition.

While the ink composition is still wet or soft enough that the multichromal microspheres, preferably bichromal microspheres, described herein can be oriented (e.g. moved and/or rotated), it is subjected to a magnetic field to allow orientation of the preferably bichromal microspheres. The step of magnetically orienting the multichromal microspheres, preferably bichromal microspheres, described herein. The step of magnetically orienting the multichromal microspheres, preferably bichromal microspheres, described herein (step ii)) comprises a step of exposing the applied coating or layer, while it is "wet", to a determined magnetic field generated at a surface of a magnetic-field-generating device, thereby orienting the multichromal microspheres, preferably bichromal microspheres, described herein along field lines of the magnetic field, i.e. a step of bringing the coated substrate sufficiently close or in contact with the magnetic-field-generating device. The magnetic-field-generating device may be disposed either on the substrate's side or on the ink composition's side. This approaching or bringing close together allows the multichromal microspheres, preferably bichromal microspheres, described herein in the coating to orient themselves with respect to the magnetic field. Noteworthy, the substrate may practically be brought into contact with the magnetic device. Alternatively, a tiny air gap, or an intermediate separating layer between the magnetic-field-generating device and the substrate may be provided. By appropriately shaping the field lines of the magnetic field, the multichromal microspheres, preferably bichromal microspheres, described herein can be oriented in any desired pattern producing a corresponding magnetically induced image or pattern which is very difficult, if not impossible to counterfeit without an appropriate, not widely available, material. The magnetic-field-generating device comprises a magnetic plate which may furthermore carry surface relief, engravings or cut-outs. WO 2005/002866 A1 and WO 2008/046702 A1 are examples for such an engraved magnetic plate. The magnetic-field-generating device used for producing the irreversibly magnetically induced image or pattern on the substrate described herein may be part of a rotating unit on a printing machine; in such case, it is correspondingly designed and adapted to the cylindrical surface of the rotating unit in order to assure a good contact with the substrate.

The step of magnetically orienting the multichromal microspheres, preferably bichromal microspheres, described herein (step ii)) can be performed either simultaneously with the step i) or subsequently to the coating step i).

After having magnetically oriented the multichromal microspheres, preferably bichromal microspheres, described herein in the ink composition, the multichromal microspheres, preferably bichromal microspheres, described herein are irreversibly oriented and fixed in their orientation and position by curing the ink composition so as to form a solid coating (step iii)). The term "curing" refers to processes including the drying or solidifying, reacting or polymerization of the applied composition in such a manner that it can no longer be removed from the surface onto which it is applied. The curing step may be based on solvent or water evaporation (e.g. physical drying); radiation mechanism including without limitation Ultraviolet-Visible light radiation curing (hereafter referred as UV-Vis) and electronic beam radiation curing (E-beam); oxypolymerization (oxidative reticulation induced by a joint action of oxygen and one or more catalysts, such as cobalt containing and manganese containing catalysts); cross-linking reactions or any combination thereof. Radiation curing is particularly preferred and UV-Vis light radiation curing is even more preferred, since these technologies advantageously lead to very fast curing processes and hence drastically decreases the preparation time of any article comprising the cured ink composition according to the present invention. Radiation-curable compositions are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited. Preferably, the radiation-curable basecoat compositions and the radiation-curable basecoat compositions described herein are UV-Vis curable compositions.

The curing step (step iii)) can be performed either simultaneously with the step of magnetically orienting the multichromal microspheres, preferably bichromal microspheres, described herein (step ii)) or subsequently to the step ii).

The irreversibly magnetically induced images or patterns according to the present invention may be used as a security element or security device for protecting security documents against counterfeiting, falsifying and illegal reproduction. The term "security document" refers to a document which is usually protected against counterfeit or fraud by at least one security feature. Examples of security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, bank cards, credit cards, transactions cards, access documents, security badges, entrance tickets, transportation tickets, security threads and the like. The term "value commercial good" refers to packaging material, in particular for pharmaceutical, cosmetics, electronics or food industry that may comprise one or more security features in order to warrant the content of the packaging like for instance genuine drugs. Example of these packaging material include without limitation labels such as authentication brand labels, tax banderoles tamper evidence labels and seals.

Also described herein are security elements or devices comprising the irreversibly magnetically induced image or pattern according to the present invention and security documents comprising one or more of said security elements or devices.

Suitable substrates for use for the security documents in the present invention include without limitation paper or other fibrous materials such as cellulose, paper-containing materials, plastic or polymer substrates, composite materials, metals or metalized materials, glasses, ceramics and combinations thereof. Typical examples of plastic or polymer substrates are substrates made of polypropylene (PP), polyethylene (PE), polycarbonate (PC), polyvinyl chloride (PVC) and polyethylene terephthalate (PET). Typical examples of composite materials include without limitation multilayer structures or laminates of paper and at least one plastic or polymer material.

With the aim of further increasing the security level and the resistance against counterfeiting and illegal reproduction of security documents, the substrate may contain watermarks, security threads, fibers, planchettes, luminescent compounds, windows, foils, decals, coatings and combinations thereof.

According to one embodiment of the present invention, the substrate described herein is transparent. In the context of the present invention, the term "transparent" is used in the sense of allowing the human eye to see through at least in some part of the visible spectrum. As used herein, the term "transparent" means providing for optical transparency at least in part of the visible spectrum (400-700 nm) and is used in the sense of allowing the human eye to see through at least in some part of the visible spectrum. Transparent substrates may be colored or tinted, entirely or in part, provided that there is transparency in at least part of the visible spectrum, such as to allow an observer to see through the substrate. A transparent substrate advantageously enables a viewing of the irreversibly magnetically induced images or patterns described above from both sides of the substrate, thus enabling the viewing of the different colors of the multichromal microspheres, preferably bichromal microspheres, described herein.

According to one embodiment of the present invention, the security document according to the present invention may further comprise one or more additional layers or coatings either below or on top of the irreversibly magnetically induced image or pattern described herein. Should the adhesion between the substrate and the irreversibly magnetically induced image or pattern described herein be insufficient, for example, due to the substrate material, a surface unevenness or a surface inhomogeneity, an additional layer, coating or a primer between the substrate and the irreversibly magnetically induced image or pattern might be applied as known for those skilled in the art. Moreover, and as disclosed in WO 2010/058026 A2, the presence of an additional layer, coating or a primer between the substrate and the irreversibly magnetically induced image or pattern could also be used to improve the visual aspect of security elements based on magnetically oriented images.

With the aim of increasing the durability through soiling or chemical resistance and cleanliness and thus the circulation lifetime of security documents, one or more protective layers may be applied on top of the irreversibly magnetically induced image or pattern. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable, more preferably UV-Vis curable compositions.

According to one embodiment of the present invention, the security document according to the present invention may further comprise one or more additional layers or coatings comprising one or more cholesteric liquid crystal materials on top of the irreversibly magnetically induced image or pattern. The one or more additional layers or coatings comprising one or more cholesteric liquid crystal materials may be continuous or discontinuous and may partially or fully cover or superimpose the irreversibly magnetically induced image or pattern. The term "cholesteric liquid crystal material" encompasses both a film made of one or more cholesteric liquid crystal polymers and pigments obtained therefrom. In addition to the semi-covert security which is visible or detectable only with the help of a light-polarizing filter, cholesteric liquid crystal materials exhibit visible optical properties including the visible color shifting effect with changing viewing angle as an overt (i.e. visible to the unaided human eye) security. As mentioned above, optical characteristics of cholesteric liquid crystal pigments include an interference effect. To generate or reveal color interference effect and strong colorshift effects, cholesteric liquid crystal material containing layers are preferably applied directly or indirectly to an absorbing surface, preferably a sufficiently dark surface. The term "absorbing surface" refers to a layer that absorbs at least part of the visible spectrum of light, preferably to a surface of a dark color. Depending on the orientation of the multichromal microspheres, preferably bichromal microspheres, within the cured ink composition, specific designs arisen from the presence of an additional layer comprising one or more cholesteric materials may be obtained. Strong color shifts may be obtained in region(s) where the additional layer comprising one or more cholesteric materials covers or superposes multichromal microspheres, preferably bichromal microspheres, which are oriented in such a way that the partial coating, preferably a dark partial coating, faces the additional layer.

An advantageous property of the solution given by the present invention resides in the ability to provide high resolution images, to provide different shade color combinations including shadows and to provide 3D effects by orienting the multichromal microspheres, preferably bichromal microspheres, described herein in a desired and defined magnetic field and fixing the orientation and position of the multichromal microspheres, preferably bichromal microspheres, in the ink composition by curing or hardening said ink composition. Moreover, the incorporation of the easily orientable (e.g. movable and/or rotatable) multichromal microspheres, preferably bichromal microspheres, described herein prevents undesirable packing of pigments in inks thus increasing the homogeneity of coatings or layers comprising said microspheres.

The invention claimed is:

1. An ink composition for producing an irreversibly magnetically induced image or pattern comprising multichromal microspheres, preferably bichromal, microspheres that are orientable upon application of a magnetic field and that comprise at least a first portion comprising one or more dyes and/or pigments and at least a second portion comprising one or more magnetic or magnetizable materials, wherein said microspheres comprise as the first portion a core having a surface and comprising the one or more dyes and/or pigments and as the second portion a partial coating covering at least a portion of the surface of said core and comprising the one or more magnetic or magnetizable materials.

2. The ink composition according to claim 1, which is a radiation curable composition, a thermal drying composition or any combination thereof.

3. The ink composition according to claim 1, wherein the core of the microspheres has a longest diameter between about 1 μm (microns) and about 100 μm (microns).

4. The ink composition according to claim 1, wherein the partial coating of the core has a thickness below about 20% of the longest diameter of the core of the microspheres.

5. The ink composition according to claim 1, wherein the core of the microspheres further comprises one or more machine readable feature substances selected from the group consisting of cholesteric liquid crystal pigments, luminescent compounds, infrared-absorbing compounds and mixtures thereof.

6. The ink composition according to claim 1, wherein the one or more magnetic or magnetizable materials are selected from the group consisting of ferromagnetic compounds, ferrimagnetic compounds and combinations or mixtures thereof.

7. The ink composition according to claim 1, wherein the multichromal microspheres are bichromal.

8. The ink composition according to claim 1, wherein the core of the microspheres comprise one or more dyes and/or pigments in a matrix made of a material selected from the group consisting of polymer materials, glasses, ceramics and mixtures thereof.

9. The ink composition according to claim 8, wherein the polymer materials are selected from the group consisting of poly(methyl methacrylates), polyethylenes, polyurethanes and mixtures thereof.

10. An irreversibly magnetically induced image or pattern on a substrate, wherein the image or pattern comprises the microspheres recited in claim 1 in a cured ink composition.

11. A process for producing an irreversibly magnetically induced image or pattern onto a substrate comprising:
  i) applying the ink composition recited in claim 1 by a process selected from the group consisting of intaglio printing, screen printing, flexographic printing gravure printing and inkjet printing onto at least a part of a substrate so as to form a coating or a layer;
  ii) magnetically orienting the microspheres contained in said ink composition by applying a magnetic field on the applied ink composition obtained under i) so as to form an oriented coating or layer; and
  iii) curing the oriented ink composition obtained under ii) so as to obtain a cured ink composition and to irreversibly fix the microspheres in the oriented positions.

12. The process according to claim 11, wherein the curing is carried out by a process selected from the group consisting of physical evaporation of volatile compounds, UV-Vis light curing, electron beam curing, oxidative reticulation, chemical crosslinking, and combinations thereof.

13. A security element or device comprising the irreversibly magnetically induced image or pattern recited in claim 10.

14. A security document comprising one or more security elements or devices comprising the irreversibly magnetically induced image or pattern recited in claim 10.

* * * * *